Patented July 12, 1927.

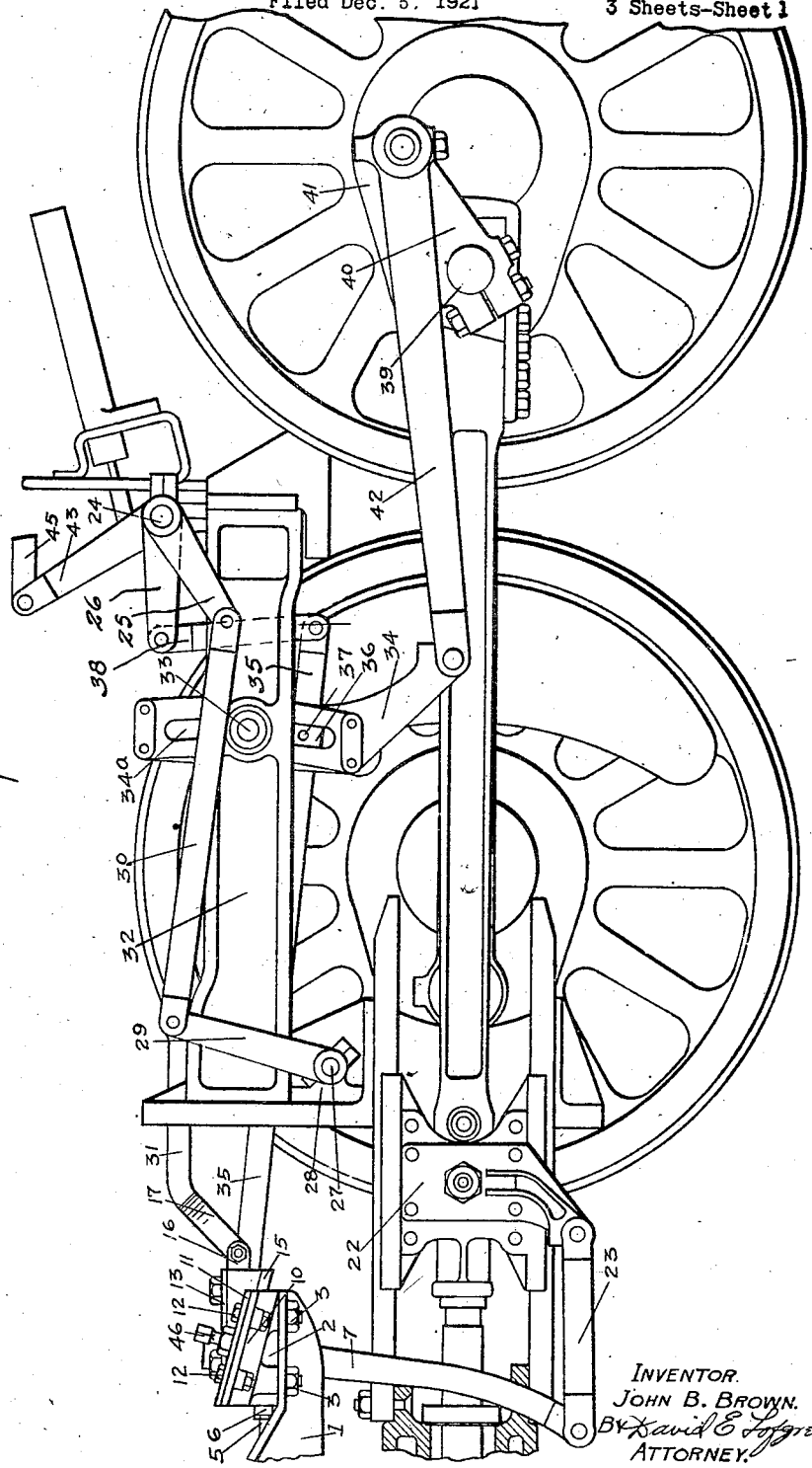

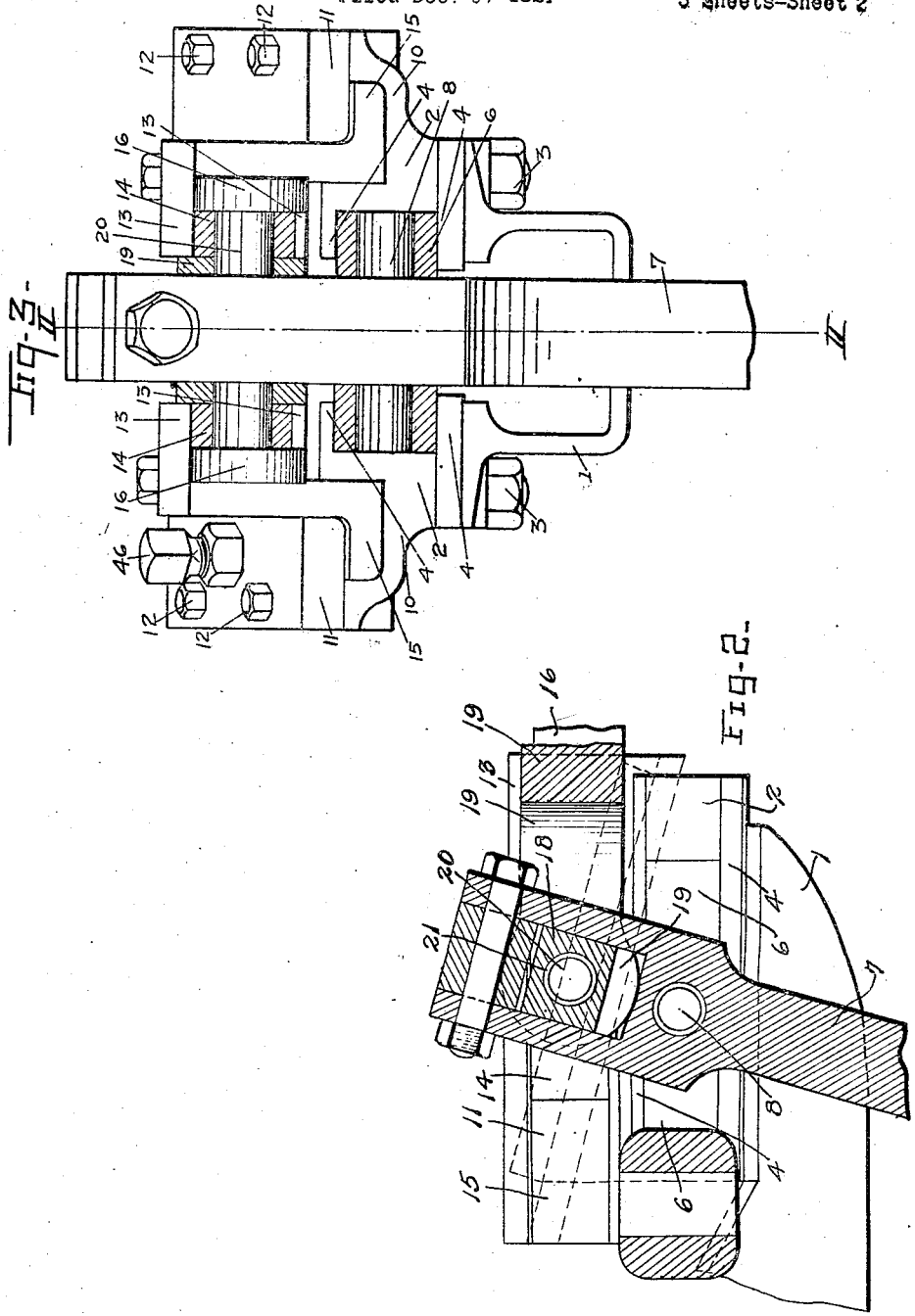

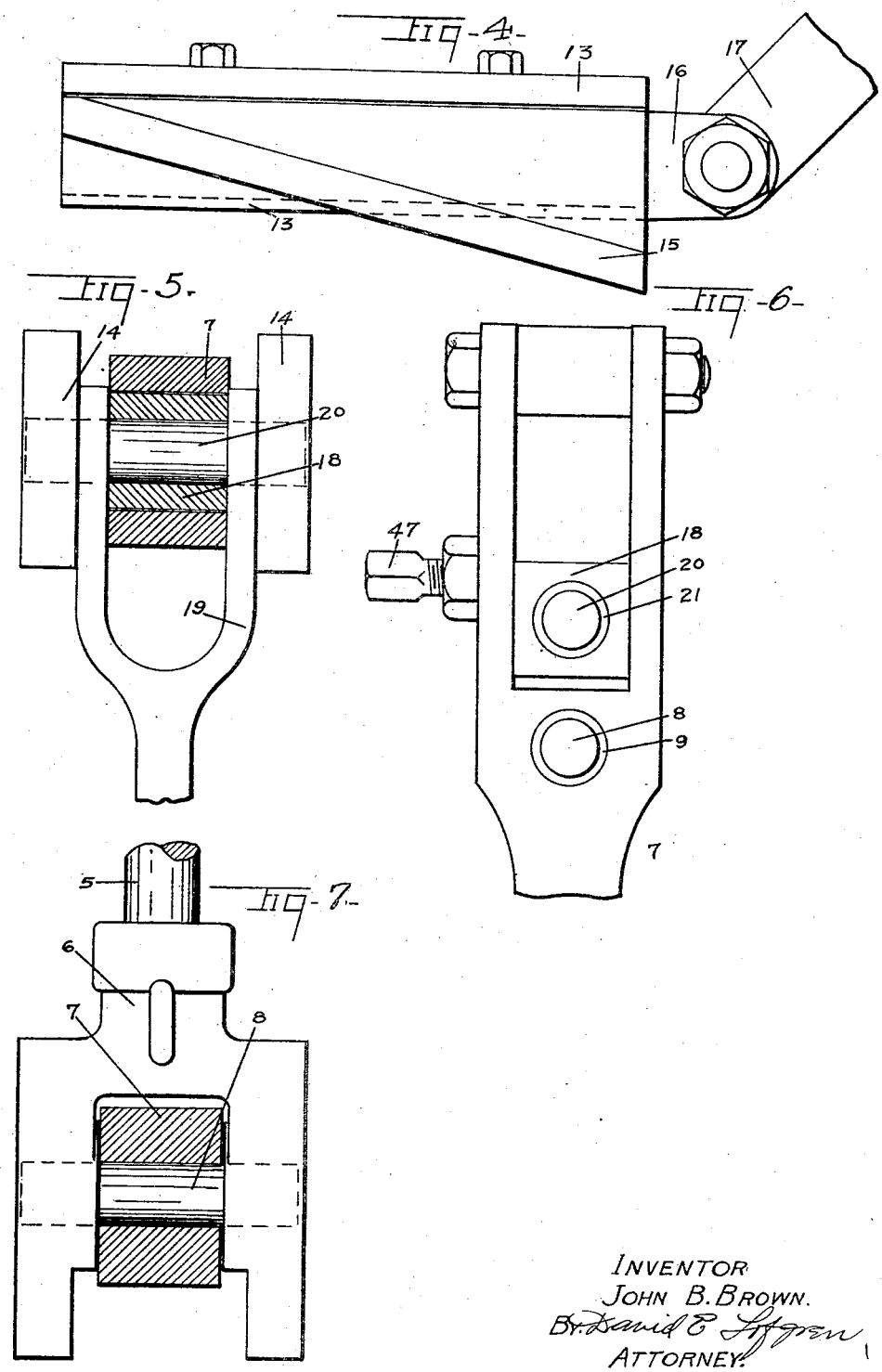

1,635,172

UNITED STATES PATENT OFFICE.

JOHN B. BROWN, OF PORTLAND, OREGON.

ENGINE VALVE GEAR.

Application filed December 5, 1921. Serial No. 519,889.

My invention relates to the type of valve gear employed on modern railway locomotives, and which is assembled outside the driving wheels and operated by connections to the main crank pin and cross head of the engine.

The object of my invention is to provide a lead regulating device, the parts of which can be assembled on any standard engine or locomotive having a radial valve gear, without in any way changing the frame of the gear. The regulating device will be operated with the reversing lever, and will be so assembled in a fixed position with respect to the valve gear parts, that the proper regulation will be provided by the valve when in either forward or backward positions. The regulating device will allow the valve to be set at any point giving the desired lead when starting the locomotive, and can be increased in correct proportions as the rate of motion increases, to provide for proper cushioning of the reciprocating parts, making a smooth working locomotive at all points of cut-off and speeds. The cut-off can be increased and the lead decreased to start the locomotive when pulling heavy loads where the greatest power is needed, preventing discomfort to passengers and damage to the equipment which is caused by taking up the slack through the train.

I attain these objects by the mechanism illustrated in the accompanying drawings, in which—

Fig. 1 is a view, in elevation, showing my improved valve gear as applied to a locomotive;

Fig. 2 is a sectional view taken along the line II—II of Fig. 3;

Fig. 3 is an end elevational view of the device shown in Fig. 2, parts of which are in section;

Fig. 4 is an elevational view of the inclined slide within which the guides are built to carry the radius rod cross head;

Fig. 5 is a plan view of the radius rod cross head showing the combining lever and the lever block in section, and the manner in which the radius rod cross head pin passes through the several parts;

Fig. 6 is an elevational view of the upper end of the combining lever, showing the manner in which the combining lever block is assembled; and Fig. 7 is a plan view of the valve rod cross head with the combining lever in section, and showing the valve rod cross head pin which corresponds to the lower pin shown in Fig. 7.

Similar numerals refer to similar parts throughout the several views.

The bracket 1 is no different from those employed on many of the locomotives equipped with the Walschaerts valve gear, and by removing the cross head guides for the valve stem cross head as is now used, the lead regulating device is assembled on the bracket in the manner shown in Figures 1, 2 and 3 of the drawings. The lower portion of the device indicated by the numeral 2, is fastened stationary to the bracket by the bolts 3, and has built within the guides 4 which are located equally on each side, and equally above and below, the center line of the valve stem 5. Within the guides 4, the valve stem cross head is placed as shown in cross section and indicated by the numeral 6 in Figure 3, and is connected to the valve stem in the manner shown in Figure 7. With the guides, the center lines of the valve and valve stem all parallel, a horizontal longitudinal motion can take place with respect to the cross head, the valve, and the valve stem.

The combining lever 7 is inserted through a suitable opening in the bracket 1 and passes through the valve stem cross head 6 to the proper position for the pin 8, to pass through the cross head and the lower bearing 9 in the combining lever. The pin is held in place by sides of the cross head guides as shown in Figure 3.

In addition to the parallel guides for the valve stem cross head in the lower portion 2 of the device, there are also the inclined guides 10 which are built equally each side of the center line but fall outside the guides 4, and have no relation therewith except to be built in the same parts and are stationary as well as the guides of the valve stem cross head. By observing the device in Figure 3 it will be seen that the parts on each side of the combining lever are the same in every case. The upper guides 11 can be removed with the bolts 12 or adjusted to provide proper operation of the incline member.

Directly above and parallel to the guides for the valve stem cross head, are the guides 13 for the radius rod cross head in which the sliding blocks 14 are fitted and are movable. The upper guides are movable with respect to the lower, since an incline 15 is built on the outside of the guides 13 and arranged in such manner as to fit the incline guides in the stationary portion of the device. When the incline is placed in the incline guides, the parts are so built that the radius rod cross head guides are parallel to the valve stem cross head guides at whatever position the incline may be moved, and it will be seen that the above mentioned guides will hold parallel with respect to each other while the incline slide is being moved. Lugs 16 projecting from the movable guides are connected by a U 17, so that both can be operated in the inclines at the same time and hold the same respective positions. Figure 4 shows the movable guides and incline free from the stationary members.

An elongated slot is provided in the upper end combining lever to admit the combining lever block 18 which is movable in the slot. The upper end of the combining lever passes through the radius rod cross head 14, and the combining lever block is raised within the elongated slot to the proper position to allow the radius rod cross head pin 20 to pass through the several parts; that is the radius rod cross head, and the bearing 21 within the said combining lever block.

The manner in which the radius rod cross head is assembled will be understood by the view in Figure 5 of the drawings.

From the above descriptions, I have shown the relation of the various parts of the regulating device and also combining lever block which is new in addition to the incline, and with which, the distance between the centers of the valve stem cross head pin and the radius rod cross head pin can be increased or decreased by changing the position of the incline slide.

The lower end of the combining lever falls to a position below the engine cross head 22 from which it is operated through the crosshead link 23 connecting the two.

In order to operate the lead regulating device by the reverse lever, additional rods and levers must be added to the reverse mechanism in the manner as follows:

On the outer end of the reverse shaft 24 is secured a reverse shaft arm 25. Behind the reverse shaft arm, as seen in Fig. 1, and also secured to the reverse shaft 24, is a raising arm 26. The purpose of the raising arm 26 is to raise and lower the rear end of the radius rod 35 and vary the cut off of the engine valves and, when moved a sufficient distance, to reverse the engine, as will be explained more fully hereafter.

The reverse shaft arm 24 operates the radius rod cross head guides 13 concurrently with the changing cut off of the valves, as just explained, through the medium of a rod 30, a rocker arm 29 and a second rod 31, which latter is connected to the U 17, previously described. The rocker arm 29 is pivoted as at 28 to some convenient part of the locomotive frame; in the case illustrated, to the guide yoke.

To this point in the specification I have only referred to additional parts and changes in the parts now employed in the Walschaerts valve gear in order to explain my invention, but it seems necessary to explain the parts and action of the gear with which my invention is to work in conjunction, in order that it will be fully understood.

A suitable frame 32, which may be built in various forms to fit the particular locomotive in question, is attached to the locomotive frame to carry the parts of the valve gear. On a shaft 33 the reverse link 34 is assembled. The reverse link has a circular elongated slot 34ª in each of the link sides. The radius of this curved slot is the same as the distance from the center line of the slot to the center of the radius rod crosshead pin 20 in the regulating device. The radius rod 35 is connected to the radius rod crosshead 14 on the forward end, and the rear end of the rod passes through the reverse link in an elongated space provided between the sides of the link. A link block 36 is movably fitted in the circular elongated slot within the link sides. A hole is provided in the block, and at the proper point on the center line of the radius rod a hole is made to admit the pin 37 which also passes through the opening provided in the block, the parts being held in the same position with respect to each other. The rear end of the radius rod extends beyond the reversing link and is connected to the reverse shaft 24 through the lifting arm 26 and the lifting link 38.

The main crank pin 39 is fitted with the eccentric crank 40 which is fastened in the position shown in Figure 1, and which holds the same position at all times with respect to the drive wheel 41.

The lower end of the reverse link 34 is connected to the eccentric crank through the eccentric rod 42.

The reach rod arm 43 is fastened to the reverse shaft 24 and connected to the reverse lever 44 through the reach rod 45.

On some of the larger locomotives the reverse mechanism is operated by power, but, the application of power to the mechanism does not change the principle of the reverse gear or my invention. Any changes in the dimensions or the precise embodiment of the parts or the whole of my invention, will in no way depart from the spirit thereof.

The operation of the valve gear in conjunction with the lead regulating device is as follows:

When the locomotive is in motion, the reverse link is rocked by the eccentric rod which receives its motion from the eccentric crank fastened to the main crank pin. When the radius rod is above or below the center of the link, the movement is transmitted to the valve stem by the radius rod and through the combining lever. When the piston is at the end of its stroke, the valve is displaced from its central position an amount equal to steam lap plus the lead. If the radius rod were directly connected to the valve stem, and the reverse link in its middle point of motion, the valve would be in its central position and the piston would be at one end of its stroke, but, when the piston is at the end of the stroke, the valve should be displaced from its central position a distance equal to steam lap plus the lead. Therefore, the radius rod is connected to the combining lever as described above, and it will be seen that the lead will be given to the valve by the combining lever, which is attached to both the valve stem and the radius rod. The description of the operation so far has been without consideration for the application of my invention, but assuming that the combining lever is built with a fixed distance between the centers of the valve stem crosshead pin and the radius rod pin, to make the valve motion understood. In such a case lead is dependent on the combining lever only, hence the lap plus the lead is equal to the horizontal distance between vertical lines through the centers of the valve stem crosshead pin and the radius rod pin, when the piston is at the end of its stroke. Inasmuch as this distance is constant it is evident with such an arrangement, that the lead is the same for all points of cutoff.

With all of the parts of the valve gear correctly built to fit the case, it is impossible to alter the lead without seriously deranging the gear. It is to change the lead, and make the Walschaert valve gear more flexible that the lead regulating device is assembled at the head of the combining lever in the manner above described in connection with this invention.

It is understood how the lead regulating device is built and assembled, and from Figure 1 it will be seen that if the arm 25 is moved to the horizontal position, the rods 30 and 31 will be moved forward and the movable member of the regulating device will move up the incline. The parts in Figure 4 are in the positions just described and can be seen from that view.

It will be noted that the radius rod is raised in the reverse link at the time when the movable member is moved up the incline, they being both operated by fixed arms on the reverse shaft. In this manner the steam lead can be increased or decreased according to the position of the reverse lever. When the movable member of the regulating device is moved up the incline, the distance between the horizontal parallel guides for the valve stem and radius rod crossheads is increased; and since the combining lever block is assembled on the radius rod crosshead pin, the distance between the center of said pin and the center of the valve stem crosshead pin will be increased. At the same time, the combining lever block is raised in the combining lever and when so raised, it forces the head of the combining lever to a more forward position. When the combining lever is so moved, the valve stem is also moved in the same direction and the lead is increased.

The position of the various parts of the gear mechanism will be the same when the reverse lever is in respective positions each side of the center or vertical position, but of course, the locomotive will run in opposite directions. That is the movable member will be in the same position with respect to the incline guides. The same lead will be given, when the radius rod is respectively in the same positions above or below the center of the reverse link, and the locomotive can be operated under the same lead in either direction.

In event that some of the parts of the regulating device become deranged, the safety screws 46 and 47 have been provided in the sliding member of the regulating device and the head of the combining lever respectively.

Referring to Fig. 3 it may be seen that should the actuating mechanism of the slide 15 be damaged or become inoperative from any cause, the damaged parts may be removed and the set screw 46 be turned to hold the incline slide in any desired position. Thereafter, the gear operates with a fixed lead for the valve similar to the Walschaert gear as heretofore known. In event the slide 15 or its associated parts should become inoperative so that the relative positions of the guides cannot be adjusted, the slide 15, the radius rod crosshead 14 and auxiliary structure is removed and the set screw 47 is tightened to maintain the combining lever block in a fixed position. Thereafter the gear operates with a fixed lead for the valve.

Having fully described my invention, I claim and desire to protect by Letters Patent:

1. A locomotive valve gear of the radial type, comprising a fixed bracket having lower guides for a valve rod cross head, a valve rod cross head slidable in said guides, upper guides, a radius rod cross head mounted in said upper guides, inclined ways supporting the upper guides, a combining lever extending through the bracket and connected to the valve rod cross head and radius rod cross head, and means for adjusting the upper guides longitudinally of the inclined ways to vary the relative vertical distance between the respective upper and lower guides, the radius rod cross head being mounted for vertical movement with the combining lever to permit vertical spacing of the valve rod cross head and radius rod cross head in the adjustment of the upper guides.

2. In a locomotive valve gear of the radial type, a bracket mounted in substantial alignment with the valve rod, a valve rod cross head, guides arranged on said bracket for said cross head, a radius rod cross head, guides arranged on the bracket for the radius rod cross head, and inclined guideways for supporting the last mentioned guides to permit the radius rod cross head to be moved vertically relative to the valve rod cross head through the adjustment of said radius rod cross head guides on the inclined guideways.

3. In a valve gear of the radial type for operating the valves of a steam locomotive, a combining lever for determining the valve lead, a movable fulcrum for said lever, a valve rod actuated by the lever and directly connected thereto, a guide for constraining movement of the fulcrum in parallelism with the valve rod, means for varying the cut-off of the valves, and means cooperating with said last mentioned means for continuously varying the distance between the guide and the valve rod proportionate to variations in the cut off of the valves.

4. In a locomotive valve gear of the radial type, a fixed bracket, a valve rod cross head, a radius rod cross head, independent guides on the bracket for each of said cross heads, with the guides arranged parallel to each other, inclined guideways carried by the bracket and slidably supporting the guides in the radius rod cross head, and means for adjusting the guides of the radius rod cross head longitudinally of said inclined guideways.

5. In an engine valve gear of the radial type a valve rod, a fixed bracket, valve rod cross head guides arranged on the bracket, inclined guideways arranged on the bracket outwardly beyond said valve rod cross head guides, slides cooperating with said inclined guideways, a radius rod, radius rod cross head guides formed on said slides, and means for operating the slides.

6. In a valve gear of the radial type for operating the valves of a steam locomotive, a combining lever for determining the valve lead, a movable fulcrum for said lever, a valve rod actuated by the lever and directly connected thereto, a guide for constraining movement of the fulcrum in parallelism with the valve rod, reversing mechanism for the valve gear and effective to vary the cut-off of the valves, and means actuated by said reversing mechanism for continuously varying the relative positions of the guide and the valve rod with the varying cut-off of the valves.

JOHN B. BROWN.